United States Patent
Murai et al.

(10) Patent No.: US 8,098,345 B2
(45) Date of Patent: Jan. 17, 2012

(54) LIQUID CRYSTAL DISPLAY DEVICE AND ELECTRONICS DEVICE

(75) Inventors: Atsuhito Murai, Osaka (JP); Hajime Imai, Osaka (JP); Hideki Kitagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/130,244

(22) PCT Filed: Jul. 30, 2009

(86) PCT No.: PCT/JP2009/063607
§ 371 (c)(1),
(2), (4) Date: May 19, 2011

(87) PCT Pub. No.: WO2010/058630
PCT Pub. Date: May 27, 2010

(65) Prior Publication Data
US 2011/0221738 A1    Sep. 15, 2011

(30) Foreign Application Priority Data

Nov. 21, 2008   (JP) .................................. 2008-298686

(51) Int. Cl.
*G02F 1/136*    (2006.01)

(52) U.S. Cl. ................ 349/50; 349/33; 349/38; 349/42; 349/43; 349/46

(58) Field of Classification Search .................... 349/33, 349/38, 42, 43, 46, 50
See application file for complete search history.

(56) References Cited

U.S. PATENT DOCUMENTS

| | | | |
|---|---|---|---|
| 6,043,892 A * | 3/2000 | Park | 356/400 |
| 2006/0170658 A1 | 8/2006 | Nakamura et al. | |
| 2010/0271335 A1* | 10/2010 | Gotoh et al. | 345/175 |

FOREIGN PATENT DOCUMENTS

| | | |
|---|---|---|
| JP | 6-276352 A | 9/1994 |
| JP | 2006-244446 A | 9/2006 |
| JP | 2007-18458 A | 1/2007 |
| WO | WO 2007/145347 A1 | 12/2007 |

* cited by examiner

*Primary Examiner* — Jennifer Doan
(74) *Attorney, Agent, or Firm* — Birch, Stewart, Kolasch & Birch, LLP

(57) ABSTRACT

A liquid crystal display device of the present invention includes a two-dimensional sensor array in which optical sensor circuits are two-dimensionally positioned. The respective optical sensor circuits are provided with a photodiode (17), an output AMP and a NetA voltage raising capacitor. The output AMP has a gate electrode, a source electrode and a drain electrode. The gate electrode, the source electrode and the drain electrode are connected to a cathode electrode (NetA) of the photodiode (17), a voltage supply wiring (Vsm) and an optical sensor output wiring (Vom), respectively. The NetA voltage raising capacitor has two electrodes. One of the two electrodes is electrically connected to the NetA, and the other of the two electrodes is electrically connected to a drive wiring (Vrwn) for supplying a drive signal to the NetA voltage raising capacitor. A storage capacitor wiring (Csn) for retaining a pixel potential also serves as the drive wiring (Vrwn). It is accordingly possible to attain a liquid crystal display device including the optical sensor circuits in which deterioration in aperture ratio of a pixel and increase in frame region surrounding a display section are suppressed.

5 Claims, 12 Drawing Sheets

LIQUID CRYSTAL DISPLAY DEVICE AND ELECTRONICS DEVICE

TECHNICAL FIELD

The present invention relates to: a display device provided with a display panel in which an optical sensor included in a pixel is incorporated; and an electronics device provided with the display device.

BACKGROUND ART

Conventionally, there has been proposed a display device provided with a display panel in which an optical sensor included in a pixel is incorporated.

In order to manufacture the display panel, it is necessary to provide, in the pixel, the optical sensor circuit and a wiring for driving the optical sensor circuit. This arrangement causes deterioration in an aperture ratio of the pixel, compared to a display panel in which the optical sensor circuit included in the pixel is not incorporated.

Patent Literature 1 discloses a configuration shown in FIG. 10 in which each display source wiring Sm also serves as an optical sensor output wiring Vom or a voltage supply wiring Vsm for supplying a voltage to an output AMP. This configuration makes it possible to suppress the deterioration in the aperture ratio of the pixel caused by providing the optical sensor in the pixel.

CITATION LIST

Patent Literature

Patent Literature 1
International Patent Application Publication No. WO 2007/145347 (Publication Date: Dec. 21, 2007)

SUMMARY OF INVENTION

Technical Problem

As shown in FIG. 10, each display source wiring Sm also serves as an optical sensor output wiring Vom or a voltage supply wiring Vsm for supplying a voltage to an output AMP. It is therefore impossible to read an optical sensor circuit while a picture element is being charged (i.e., while video data is being applied to a source wiring) as shown in FIG. 11. The optical sensor circuit can be read just in retrace interval time. Therefore, in a case where the retrace interval time is shortened, for example, a case where resolution (VGA, XGA etc.) of display is increased, or in a case where performance of the output AMP deteriorates (for example, a case where an AMP transistor is formed with a-Si), each display source wiring Sm has difficulty serving as the optical sensor output wiring Vom or the voltage supply wiring Vsm.

In order to solve the problem, for example, it is considerable that, as shown in FIG. 12, the optical sensor output wiring Vom and the voltage supply wiring Vsm for supplying a voltage to the output AMP are provided in addition to the display source wirings Sm, respectively. This causes increase in the number of optical sensor drive wirings (optical sensor output wiring Vom and voltage supply wiring Vsm for supplying a voltage to the output AMP). Therefore, the aperture ratio of the pixel is deteriorated in comparison to a case where the optical sensor circuit is not provided.

The present invention was made in view of the above problem, and an object of the present invention is to attain a liquid crystal display device including a pixel in which an optical sensor circuit is incorporated, in which liquid crystal display device the deterioration in the aperture ratio of the pixel and increase in a frame region surrounding a display section are suppressed.

Solution to Problem

A liquid crystal display device of the present invention, including: an active matrix substrate in which at least a scanning signal line, a video signal line, a thin film transistor element for driving a pixel, a pixel electrode and a storage capacitor wiring for retaining an electric potential of the pixel electrode are provided; a counter substrate facing the active matrix substrate; a liquid crystal layer sandwiched between the active matrix substrate and the counter substrate; and a two-dimensional sensor array in which optical sensor circuits are two-dimensionally positioned, the optical sensor circuits each including at least a photodiode that outputs a signal corresponding to quantity of light that the photodiode receives, a thin film transistor element and a charge-storage element, the thin film transistor having a gate electrode, a source electrode and a drain electrode, the gate electrode, the source electrode and the drain electrode being connected to a cathode electrode of the photodiode, a voltage supply wiring and an optical sensor output wiring, respectively, the charge-storage element having two electrodes, one of the two electrodes being electrically connected to the cathode electrode of the photodiode, and the other of the two electrodes being electrically connected to a drive wiring for supplying a drive signal to the charge-storage element, and the storage capacitor wiring also serving as at least one of the drive wiring for driving the charge-storage element and the voltage supply wiring for supplying a voltage to the thin film transistor element.

According to the above arrangement, the storage capacitor wiring for supplying an external voltage to a liquid crystal storage capacitor provided in each pixel also serves as at least one of the drive wiring for supplying the drive signal to the charge-storage element that constitutes the optical sensor circuit and the voltage supply wiring for supplying a voltage to the thin film transistor element that constitutes the optical sensor circuit. This provides the pixel with a greater aperture ratio as much as the reduction in the number of wirings which reduction is caused by utilizing the storage capacitor wiring also as the at least one of the drive wiring and the voltage supply wiring.

For example, in a case where the storage capacitor wiring also serves as the drive wiring for supplying the drive signal to the charge-storage element that constitutes the optical sensor circuit, it is accordingly unnecessary to additionally provide the drive wiring. This leads to increase in the aperture ratio.

Further, in a case where the storage capacitor wiring also serves as the voltage supply wiring for supplying a voltage to the thin film transistor element that constitutes the optical sensor circuit, it is accordingly unnecessary to additionally provide the voltage supply wiring. This leads to increase in the aperture ratio.

Further, in a case where the storage capacitor wiring also serves as the two wirings (drive wiring and voltage supply wiring), it is accordingly unnecessary to additionally provide the two wirings. This leads to further increase in the aperture.

Furthermore, the above arrangement makes it unnecessary to provide not only ICs for driving the wirings but also drawing wirings for the ICs which drawing wirings surround a display section, and regions where the ICs are provided. This makes it possible to narrow a frame part of the liquid crystal display device of the present invention.

It is preferable that a voltage applied to the storage capacitor wiring is changed to a predetermined electric potential immediately before a voltage of the pixel electrode of the liquid crystal display device is rewritten.

A liquid crystal storage capacitor wiring that constitutes a liquid crystal display element is normally provided in addition to wirings included in the optical sensor circuit. Therefore, a picture element charging operation (operation of applying a specific voltage to a pixel electrode) is not limited by a timing for detecting the optical sensor circuit, or the like.

Meanwhile, as described above, the storage capacitor wiring that constitutes the liquid crystal display element also serves as at least one of the drive wiring and the voltage supply wiring included in the optical sensor circuit. This arrangement makes it possible to raise (in a case where the thin film transistor element is n-ch) or decrease (in a case were the thin film transistor element is p-ch) the voltage applied to the storage capacitor wiring so that the optical sensor circuit is driven. Raising and decreasing the voltage applied to the storage capacitor wiring affects a pixel potential applied to the liquid crystal display element thereby deteriorating a display quality.

However, as described above, the voltage applied to the storage capacitor wiring is raised or decreased to the predetermined electric potential immediately before the voltage of the pixel electrode of the liquid crystal display device is rewritten. This makes it possible to obscure the shift of the pixel potential applied to the liquid crystal display element.

It is preferable that a single wiring serves as the storage capacitor wiring, the drive wiring and the voltage supply wiring.

According to the above arrangement, the single wiring serves as the three wirings. This arrangement makes it unnecessary to additionally provide two more wirings. It is therefore possible to improve the aperture ratio. For example, in a case where the storage capacitor wiring also serves as the two wirings (drive wiring and voltage supply wiring), it is accordingly unnecessary to additionally provide the two wirings. This leads to further increase in the aperture ratio.

Further, reduction in the number of wirings from three to one makes it unnecessary to provide ICs for driving the two wirings omitted by the reduction. This also makes it unnecessary to provide drawing wirings for the ICs which drawing wirings surround the display section, and regions where the ICs are provided. It is therefore possible to narrow the frame part of the liquid crystal display device of the present invention.

It is preferable that in a case where the storage capacitor wiring also serves as the voltage supply wiring, the storage capacitor wiring is DC-driven.

Generally, a constant electric potential is applied to the voltage supply wiring for supplying a voltage to the thin film transistor element in the optical sensor circuit. In the case where the storage capacitor wiring also serves as merely the signal supply wiring as described above, the storage capacitor wiring is sufficiently driven by DC. Therefore, the voltage applied to the storage capacitor wiring is neither raised nor decreased. As a result of this, the voltage applied to the pixel electrode is not raised. In this manner, deterioration in the display quality is prevented.

The liquid crystal display device is applicable to any electrics devices in a case where the any electrics devices are electrics devices in which a touch panel is incorporated.

Advantageous Effects of Invention

A liquid crystal display device of the present invention, including: an active matrix substrate in which at least a scanning signal line, a video signal line, a thin film transistor element for driving a pixel, a pixel electrode and a storage capacitor wiring for retaining an electric potential of the pixel electrode are provided; a counter substrate facing the active matrix substrate; a liquid crystal layer sandwiched between the active matrix substrate and the counter substrate; and a two-dimensional sensor array in which optical sensor circuits are two-dimensionally positioned, the optical sensor circuits each including at least a photodiode that outputs a signal corresponding to quantity of light that the photodiode receives, a thin film transistor element and a charge-storage element, the thin film transistor having a gate electrode, a source electrode and a drain electrode, the gate electrode, the source electrode and the drain electrode being connected to a cathode electrode of the photodiode, a voltage supply wiring and an optical sensor output wiring, respectively, the charge-storage element having two electrodes, one of the two electrodes being electrically connected to the cathode electrode of the photodiode, and the other of the two electrodes being electrically connected to a drive wiring for supplying a drive signal to the charge-storage element, and the storage capacitor wiring also serving as at least one of the drive wiring for driving the charge-storage element and the voltage supply wiring for supplying a voltage to the thin film transistor element. By the reduction in the number of wirings in the pixel by utilizing the storage capacitor wiring as the at least one of the drive wiring and the voltage supply wiring, it becomes possible to provide the pixel with a greater aperture ratio as much as the reduction in the number of wirings in the pixel. This reduction in the number of wirings in the pixel also makes it unnecessary to provide not only ICs for driving the wirings but also drawing wirings for the ICs which drawing wirings surround a display section, and regions where the ICs are provided. It is accordingly possible to narrow a frame part of the liquid crystal display device of the present invention.

DESCRIPTION OF EMBODIMENTS

First Embodiment

The following describes an embodiment of the present invention. The present embodiment describes a case where a display device of the present invention is applied to a liquid crystal display device in which an optical sensor touch panel is incorporated (hereinafter referred to as an optical sensor TP system).

Figure 2:
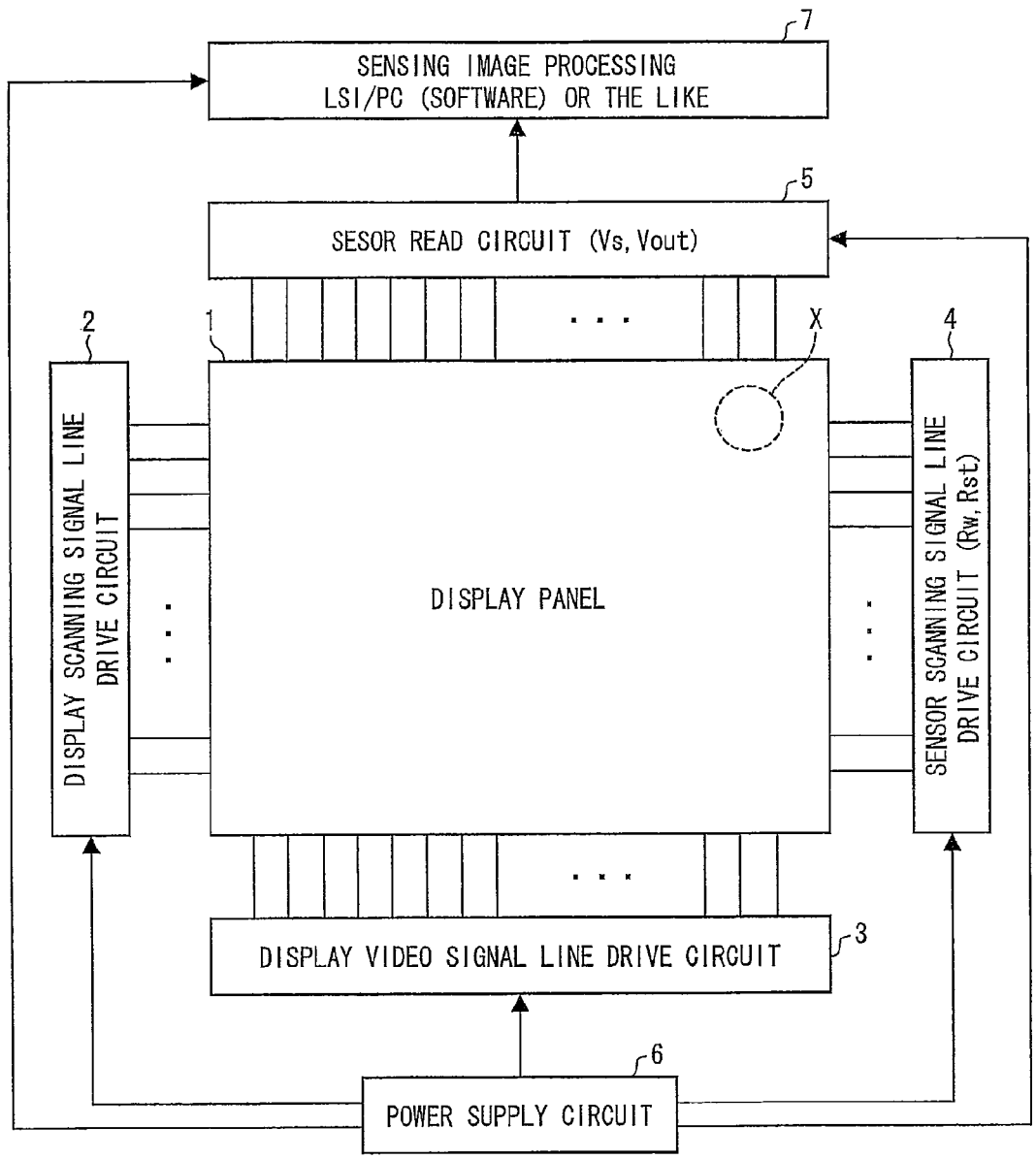
FIG. 2 is a block diagram showing a principal arrangement of a liquid crystal display device.

As shown in FIG. 2, the optical sensor TP system of the present embodiment is provided with: a display panel (liquid crystal display panel) 1 including a photodiode (photoelectric element) serving as an optical sensor, the display panel 1 being provided in a main portion of the optical sensor TP system; a display scanning signal line drive circuit 2 and a display video signal line drive circuit 3 that are circuits for causing the display panel 1 to display; a sensor scanning signal line drive circuit 4 and a sensor read circuit 5 that are circuits for causing the display panel 1 to serve as a touch panel; a sensing image processing LSI 7 (PC (including software)) for determining a touched coordinate on the basis of sensing data transmitted from the sensor read circuit 5; and a power supply circuit 6.

The liquid crystal display device shown in FIG. 2 is an example of the present embodiment. The liquid crystal display device of the present embodiment is not limited to this arrangement. Other circuits, for example, the display scanning signal line drive circuit 2 or the display video signal line drive circuit 3 may also serve as the sensor scanning signal line drive circuit 4 and/or the sensor read circuit 5. Further, the sensing image processing LSI 7 may also serve as the sensor read circuit 5.

Figure 1:
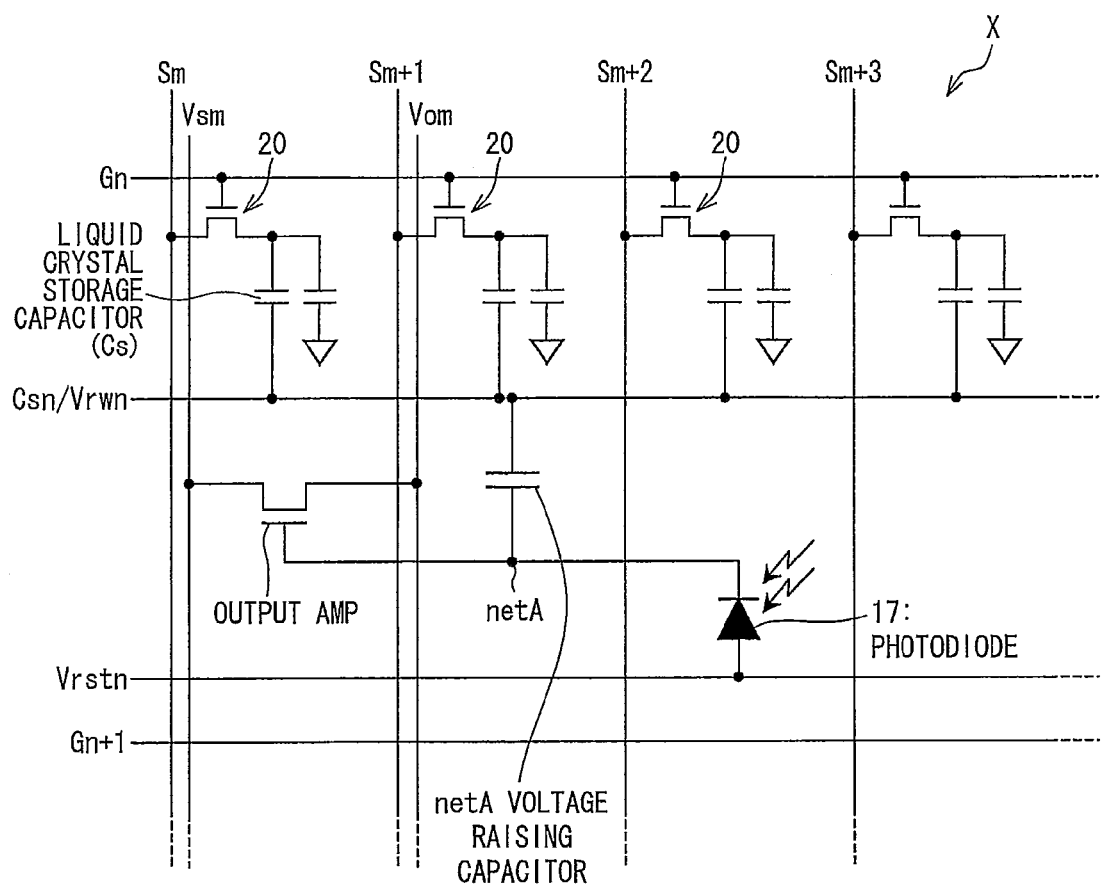
FIG. 1 is an equivalent circuit diagram of one pixel included in a liquid crystal display device in accordance with an embodiment of the present invention.

FIG. 1 is an equivalent circuit diagram of one pixel, the diagram being obtained by enlarging a part of the display panel 1 shown in FIG. 2.

Figure 3:
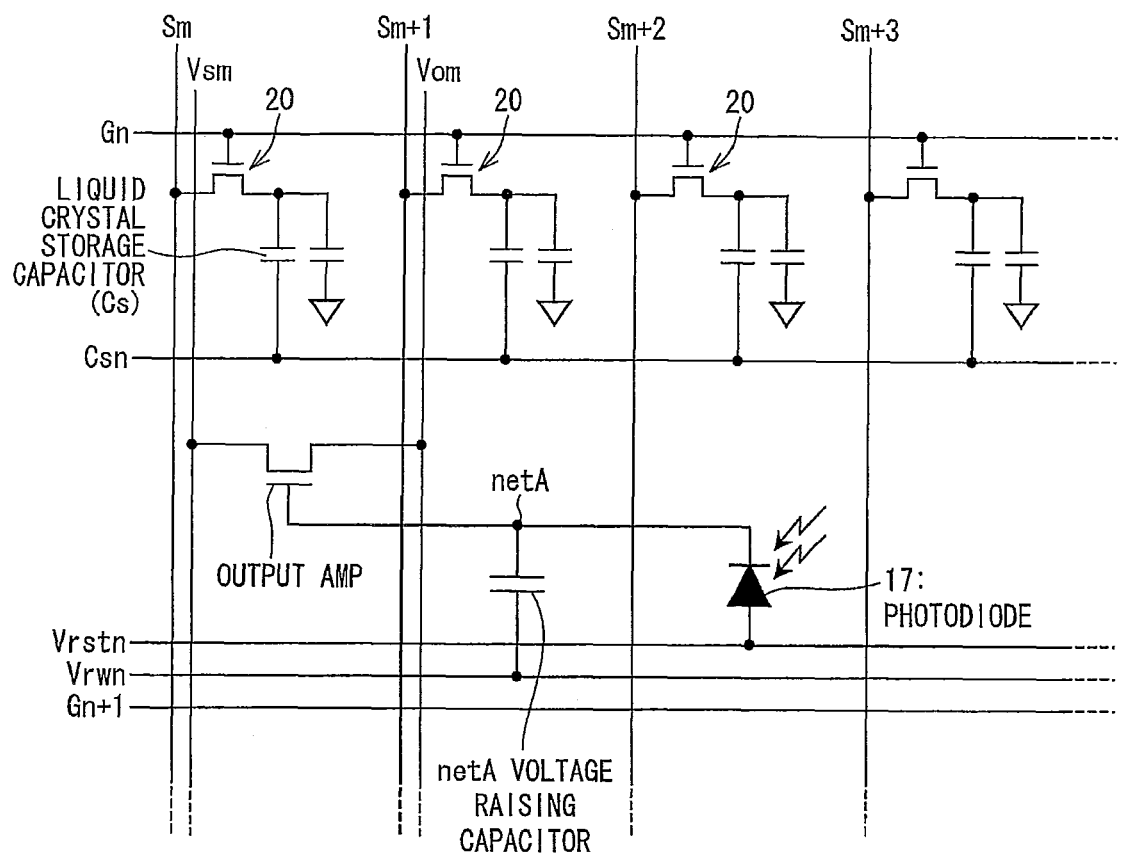
FIG. 3 is an equivalent circuit diagram showing a comparative example of the equivalent circuit diagram shown in FIG. 1.

FIG. 3 is an equivalent circuit diagram showing a comparative example of the equivalent circuit diagram shown in FIG. 1.

The display panel 1 is supposed to be an active matrix liquid crystal display panel in which pixels are arranged in a matrix manner and each of the pixels drives independently. The display panel 1 includes a generally-arranged active matrix substrate (an active matrix substrate (not shown) in which a scanning signal line, a video signal line, a thin film transistor element for driving a pixel, a pixel electrode, and a storage capacitor wiring for retaining an electric potential of the pixel electrode are formed), a counter substrate (not shown) facing the active matrix substrate, a liquid crystal layer (not shown) sandwiched between the active matrix substrate and the counter substrate, and a two-dimensional sensor array (not shown) in which optical sensor circuits are two-dimensionally positioned.

In FIGS. 1 and 3, reference signs n, n+1, m, and m+1 described in edges of wirings indicate n line, n+1 line, m line, and m+1 line, respectively.

The following describes the comparative example. As shown in FIG. 3, a pixel X included in the display panel 1 is provided with a gate wiring (Gn), a source wiring (Sm) and a storage capacitor wiring (Csn) that are display wirings, and a reset wiring (Vrstn) for resetting the photodiode (photoelectric element) 17, a drive wiring (Vrwn) for driving a NetA voltage raising capacitor (charge-storage element), a voltage supply wiring (Vsm) for supplying a voltage to an output AMP (thin film transistor element) and an optical sensor output wiring (Vom) that are optical sensor circuit wirings.

The gate wiring (Gn) is a wiring for supplying, to the display drive TFT element (liquid crystal display element) 20, a scanning signal transmitted from the display scanning signal line drive circuit 2. The source wiring (Sm) is a wiring for supplying, to the display drive TFT element 20, a video signal transmitted from the display video signal line drive circuit 3 which wiring is provided orthogonally to the gate wiring (Gn).

The storage capacitor wiring (Csn) is positioned parallel to the gate wiring (Gn), and connected to a storage capacitor (Cs) formed in the display drive TFT element 20.

The reset wiring (Vrstn) for resetting the photodiode 17 is positioned parallel to the gate wiring (Gn), and connected to an anode of the photodiode 17. The reset wiring (Vrstn) is a wiring for supplying a reset signal transmitted from the sensor scanning signal line drive circuit 4.

The NetA voltage raising capacitor drive wiring (Vrwn) is positioned parallel to the gate wiring (Gn), and connected to an electrode of a NetA voltage raising capacitor provided in parallel with a node; NetA of a cathode of the photodiode 17, the electrode being opposite to the node; NetA.

The voltage supply wiring (Vsm) for supplying a voltage to the output AMP is positioned parallel to the source wiring (Sm), and connected to a source electrode of the output AMP.

The optical sensor output wiring (Vom) is a wiring for outputting, to the sensor read circuit 5, an output signal outputted from the output AMP which output signal changes in accordance with quantity of light that the photodiode 17 receives.

The optical sensor output wiring (Vom) is positioned parallel to the source wiring (Sm), and connected to a drain electrode of the output AMP.

As described above, the display panel 1 includes not only the display wirings but also the optical sensor circuit wirings provided in addition to the display wirings. Additionally providing the optical sensor circuit in the display panel 1 leads to increase in the number of wirings. This causes deterioration in an aperture ratio of a pixel.

In order to solve the problem, a circuit of the present invention is configured as shown in FIG. 1 such that a single wiring serves as the storage capacitor wiring (Csn) that is one of the display wirings, and the NetA voltage raising capacitor wiring (Vrwn) that is one of the optical sensor circuit wirings. Specifically, the storage capacitor wiring (Csn) also serves as the NetA voltage raising capacitor wiring (Vrwn). This configuration makes it unnecessary to additionally provide the NetA voltage raising capacitor wiring (Vrwn). This leads to increase in the aperture ratio, compared to the circuit configuration shown in FIG. 3. This configuration also makes it unnecessary to provide not only an IC for driving the Vrwn wiring but also a drawing wiring for the IC which drawing wiring surrounds a display section, and a region where the IC is provided. It is therefore possible to narrow a frame part of the optical sensor TP system.

Figure 4:
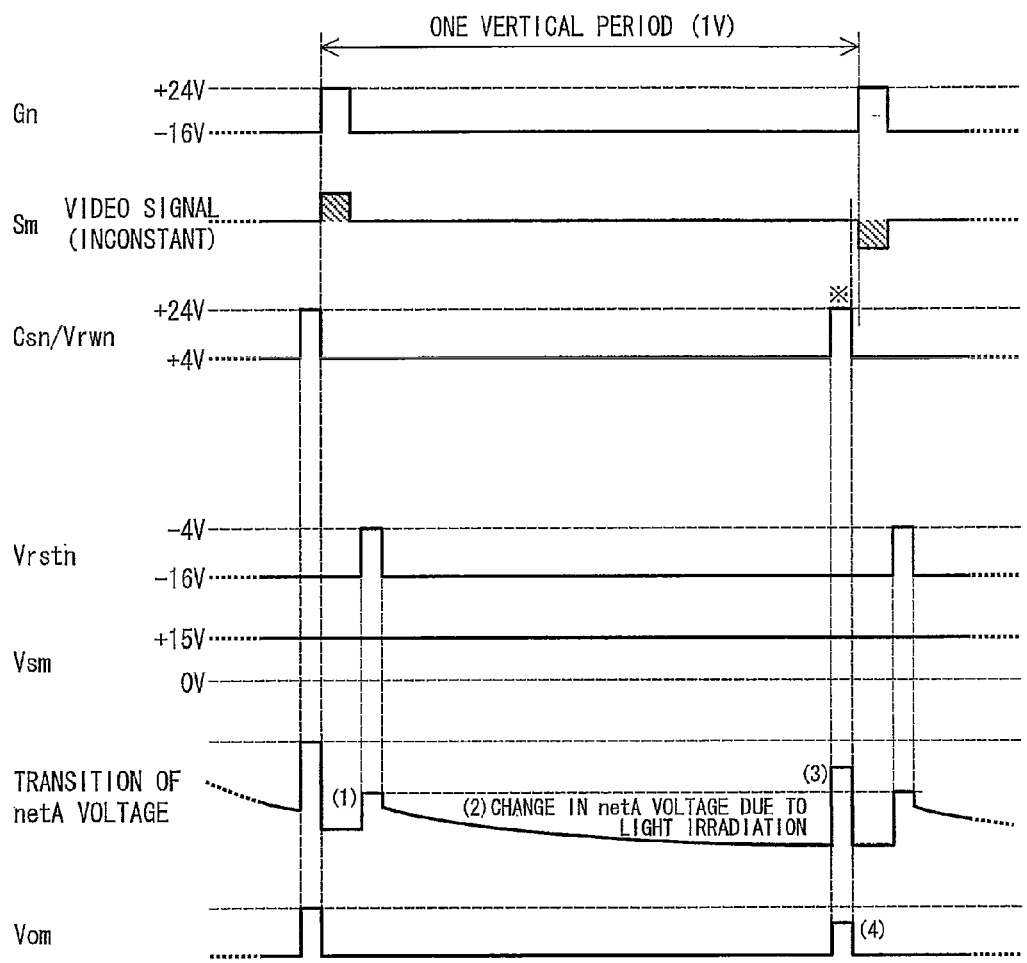
FIG. 4 is a timing chart of the equivalent circuit shown in FIG. 1.
Figure 5:
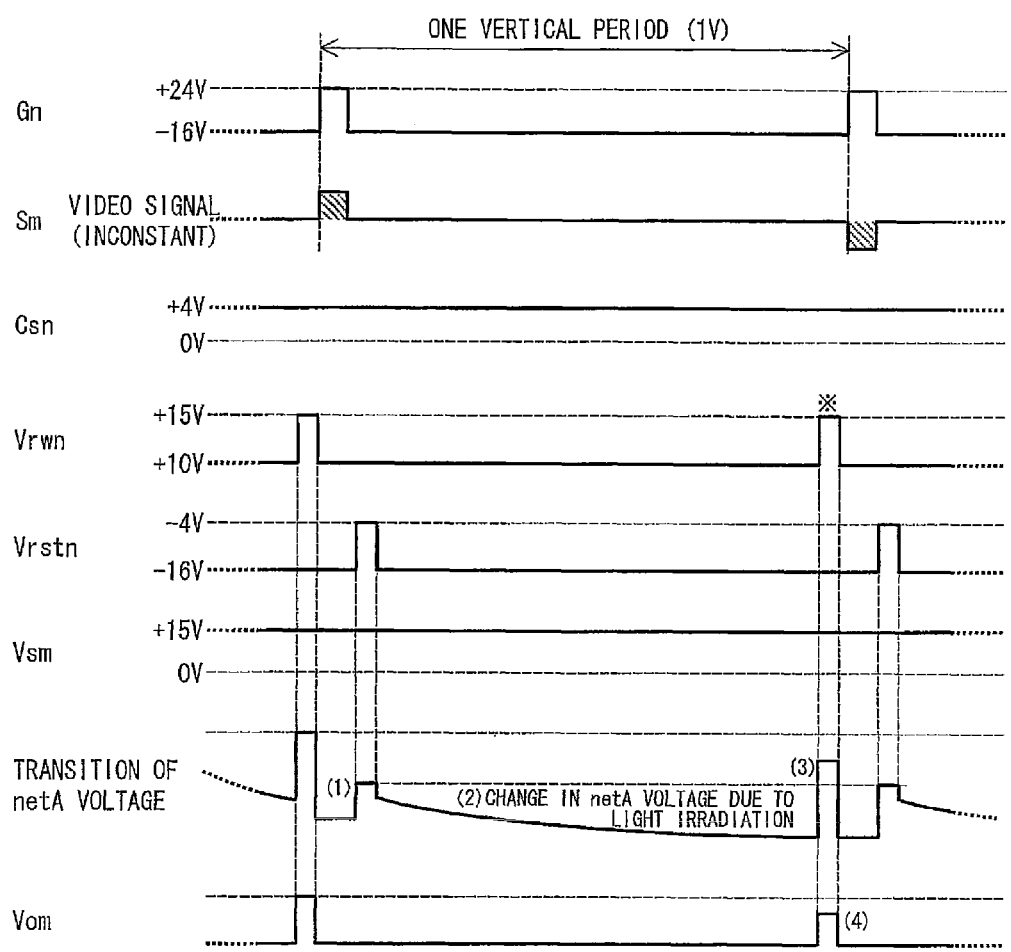
FIG. 5 is a timing chart of the equivalent circuit shown in FIG. 3.

The circuits shown in FIGS. 1 and 3 are configured with elements as follows and driven under the following drive condition. FIGS. 4 and 5 are timing charts in a case where the circuits are driven according to the drive condition. Specifically, FIG. 4 is the timing chart of the circuit shown in FIG. 1 of the present application. Further, FIG. 5 is the timing chart of the circuit shown in FIG. 3 which circuit is the comparative example of the circuit shown in FIG. 1.

<Element Size>

L/W of the photodiode 17: 4/50 μm

Capacitance of capacitor for raising a voltage applied to NetA: 0.25 pf

L/W of the output AMP: 4/60 μm

<Drive Condition>

As to a drive voltage, see the timing charts shown in FIGS. 4 and 5.

Vrstn: High width 20 μsec

Vrwn: High width 20 μsec

A sensor output period (output period of Vom) is 20 μsec from the above.

<Others>

Temperature: 27° C.

Illumination intensity: 70 LX

FIGS. 4 and 5 show the timing charts in a case where the respective circuits (the circuits shown in FIGS. 1 and 3) are driven under the above drive condition. (1) to (4) shown in FIGS. 4 and 5 correspond to the following (1) to (4), respectively.

(1) A voltage of a NetA is reset to a voltage closer to a reset voltage high-level by raising the voltage applied to the Vrstn wiring (applying forward bias to the photodiode 17).

(2) The voltage of the NetA changes (deteriorates) in accordance with quantity of light that the photodiode 17 receives.

(3) As shown in FIG. 4, in a case where the voltage applied to the Csn wiring (that also serves as the Vrwn wiring) is raised, an electric potential of the NetA is accordingly raised via the NetA voltage raising capacitor. This causes a gate of the AMP to open. As a result of this, a voltage equivalent to Vs voltage is outputted from the AMP. The voltage outputted from the AMP (sensor output Vout) is different depending on difference between the voltages of the NetA described in (2), in other words, how much the gate of the output AMP opens.

In a case where, as shown in FIG. 3, the Csn wiring does not also serve as the Vrwn wiring, the timing chart is shown as FIG. 5.

(4) The difference between the outputted voltages (sensor output Vout) described in (3) is detected outside a panel. In this manner, white/black state is detected.

What is important here is, in the circuit configuration shown in FIG. 1, to raise the voltage applied to the Csn wiring immediately before a picture element is charged, and to read the sensor output Vout prior to starting to charge the picture element (to terminate sensing operation).

That is, in the circuit configuration shown in FIG. 1 in which the Csn wiring also serves as the Vrwn, raising the voltage applied to the Csn wiring causes the picture element potential to increase. Increasing the voltage applied to the Csn wiring immediately before the picture element is charged makes it possible to obscure shift of the picture element potential.

Meanwhile, according to the circuit configuration of the comparative example shown in FIG. 3, the voltage applied to the Csn wiring is fixed to a DC level (+4V in FIG. 5), and therefore the picture element potential is not shifted. Further, the Vrwn wiring is provided in addition to the Csn wiring. Therefore, a timing for sensing operation (raising the voltage applied to the Vrwn wiring and reading the Vrwn wiring) is not particularly limited at any time, provided that the timing should be within a period in which the picture element is charged (period in which the voltage applied to the Gn wiring is raised).

Second Embodiment

The following describes another embodiment of the present invention.

First Embodiment describes a case where a single wiring serves as the Csn wiring and the Vrwn wiring. Meanwhile, the present embodiment describes a case where a single wiring serves as the Csn wiring and the voltage supply wiring (Vsm wiring) for supplying a voltage to the AMP.

Figure 6:
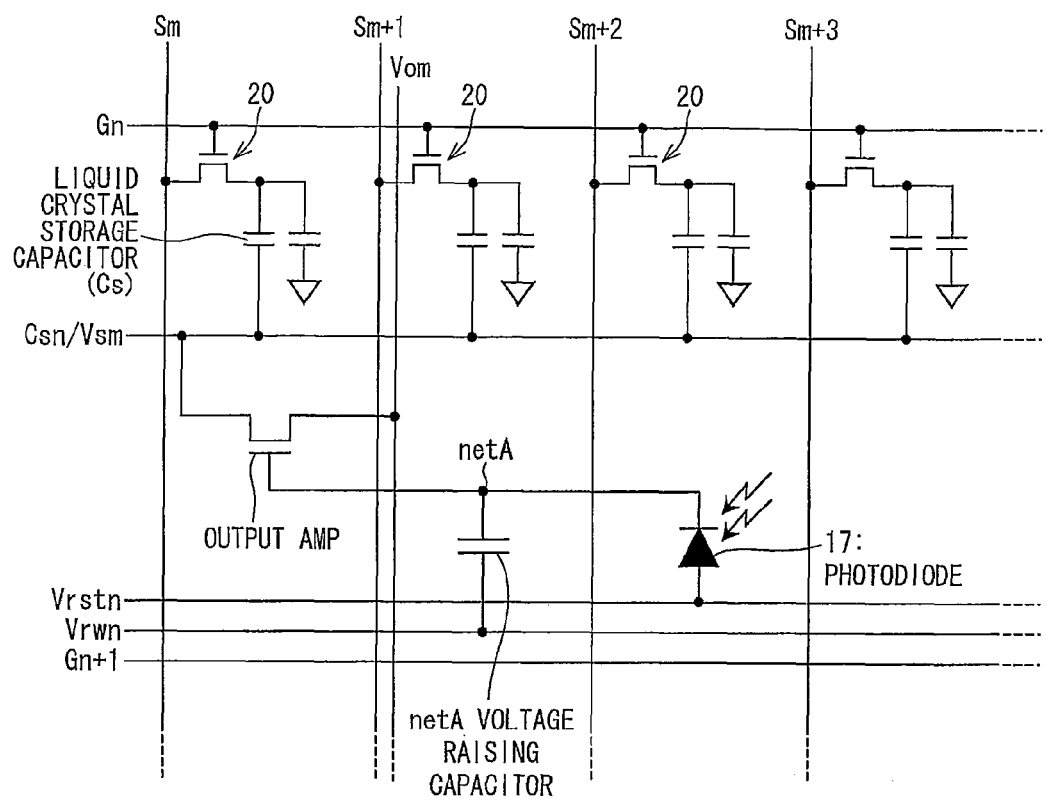
FIG. 6 is an equivalent circuit diagram of one pixel included in a liquid crystal display device in accordance with another embodiment of the present invention.

FIG. 6 is a view showing a circuit configuration in which the single wiring serves as the Csn wiring and the Vsm wiring.

As shown in FIG. 6, an optical sensor TP system of the present embodiment is configured such that the single wiring serves as the Csn wiring and the Vsm wiring that is the wiring for supplying a voltage to the AMP. Configurations other than the above-described configuration are identical to the circuit configuration shown in FIG. 1 of First Embodiment.

As shown in FIG. 6, a circuit of the present embodiment is configured such that the storage capacitor wiring Csn that is one of the display wirings also serves as the Vsm wiring that is one of the optical circuit. As with First Embodiment, this configuration makes it unnecessary to additionally provide the Vsm wiring. This leads to increase in the aperture ratio, compared to the circuit configuration shown in FIG. 3. This configuration also makes it unnecessary to provide not only an IC for driving the Vsm wiring but also a drawing wiring for the IC which drawing wiring surrounds the display section, and a region where the IC is provided. It is therefore possible to narrow a frame part of the optical sensor TP system.

Figure 7:
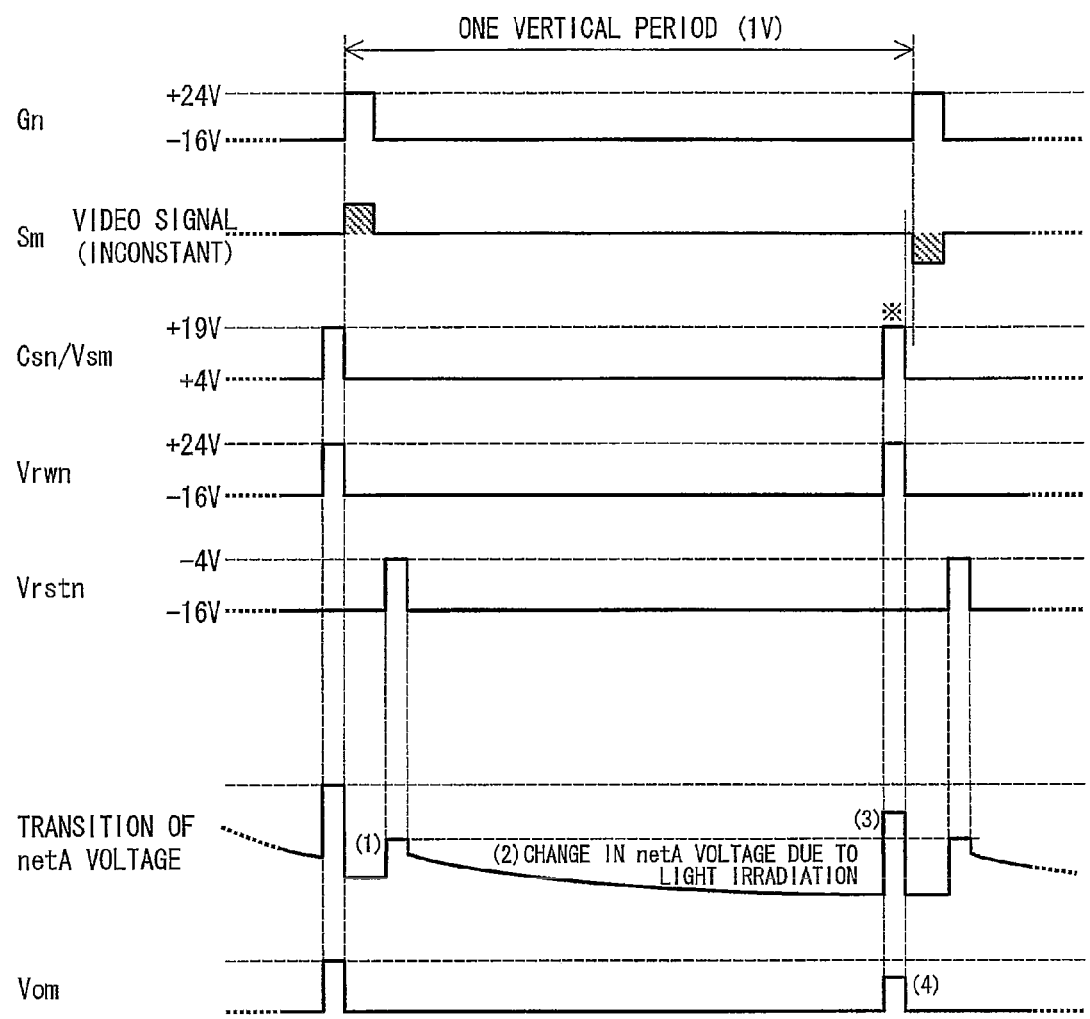
FIG. 7 is a timing chart of the equivalent circuit shown in FIG. 6.

The circuit shown in FIG. 6 is configured with elements in such a manner that the circuit of First Embodiment is configured. Further, the circuit shown in FIG. 6 is driven under a drive condition identical to the drive condition under which the circuit of First Embodiment is driven. FIG. 7 shows a timing chart in a case where the circuit shown in FIG. 6 is driven under the above drive condition. (1) to (4) shown in FIG. 7 correspond to the following (1) to (4), respectively.

(1) A voltage of a NetA is reset to a voltage closer to a reset voltage high-level by raising the voltage applied to the Vrstn wiring (applying forward bias to the photodiode 17).

(2) The voltage of the NetA changes (deteriorates) in accordance with quantity of light that the photodiode 17 receives.

(3) In a case where the voltage applied to the Vrwn wiring is raised, the voltage of the NetA is raised. This causes a gate of the AMP to open. At this time, a voltage applied to a wiring connected to a power supply line (corresponding to the Vsm wiring in the comparative example shown in FIG. 3) for supplying a voltage to the AMP is also raised, and therefore a voltage equivalent to the raised voltage is outputted to the Vom wiring. The voltage outputted to the Vom wiring is different depending on difference between the voltages of the NetA described in (2), in other words, how much the gate of the output AMP opens. Note that the voltage applied to the Csm wiring may be DC (+4V), while the present embodiment describes a case where a pulse (+4V→+15V) is applied to the Csm wiring (Vsm wiring) so as to increase the voltage to be outputted to the Vom wiring as much as possible.

(4) Detection of the difference between the outputted voltages (sensor output Vout) described in (3) is carried out outside a panel. In this manner, white/black state is detected.

The following describes two important matters.

(A) In a case where a pulse voltage is applied to the Csn (Vsm) wiring, the voltage applied to the Csn wiring is raised immediately before the picture element is charged, and the sensor output Vout is read prior to starting to charge the picture element (sensing operation is terminated), as with First Embodiment. The reason for the above is identical to that described in First Embodiment. Therefore, the explanation for the reason is not repeated in this embodiment.

According to the comparative example shown in FIG. 3, as shown in FIG. 5, the voltage applied to the Csn wiring is fixed to the DC level, and therefore the picture element potential is not shifted. Further, the voltage applied to the Vsm wiring that is provided in addition to the Csn wiring may reach a certain level of voltage in a case where the voltage applied to the Vrw wiring is raised. Therefore, the timing for sensing operation is not limited at any time, provided that the timing should be within the period in which the picture element is charged (period in which the voltage applied to the Gn wiring is raised) either, as with First Embodiment.

(B) In a case where a DC voltage is applied to the Csn (Vsm) wiring, the picture element potential is not shifted as with the comparative example shown in FIG. 3. Therefore, the timing for sensing operation is not limited at any time, provided that the timing should be within the period in which the picture element is charged (period in which the voltage applied to the Gn wiring is raised).

Third Embodiment

The following describes yet another embodiment of the present invention.

First Embodiment describes the case where the Csn wiring also serves as the Vrwn wiring. Further, Second Embodiment describes the case where the Csn wiring also serves as the voltage supply wiring (Vsm wiring) for supplying a voltage to the AMP. Meanwhile, the present embodiment describes a case where a single wiring serves as the Csn wiring, the Vrwn wiring and the voltage supply wiring (Vsm wiring) for supplying a voltage to the AMP.

Figure 8:
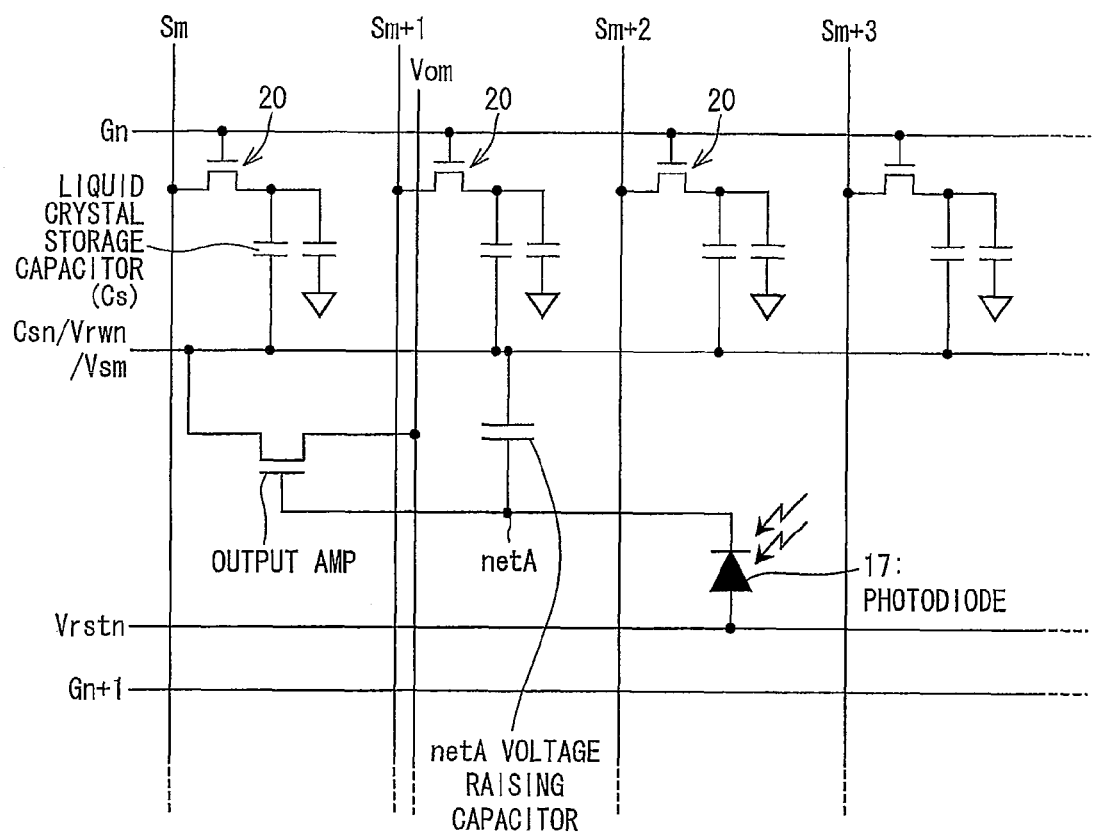
FIG. 8 is an equivalent circuit diagram of one pixel included in a liquid crystal display device in accordance with yet another embodiment of the present invention.

FIG. 8 is a view showing a circuit configuration in which the single wiring serves as the Csn wiring, the Vrwn wiring and the Vsm wiring.

As shown in FIG. 8, an optical sensor TP system of the present embodiment is configured such that the single wiring serves as the Csn wiring, the Vrwn wiring and the Vsm wiring. Configurations other than the above-described configuration are identical to the circuit configuration shown in FIG. 1 of First Embodiment.

As shown in FIG. 8, the circuit of the present embodiment is configured such that the storage capacitor wiring Csn that is one of the display wirings also serves as the Vsm wiring and the Vrwn wiring that are the optical sensor circuit wirings. This configuration makes it unnecessary to additionally provide the Vsm wiring and the Vrwn wiring. As with First and Second Embodiments, this leads to increase the aperture ratio, compared to the circuit configuration shown in FIG. 3.

That is, the circuit configuration shown in FIG. 8 is different from the circuit configuration shown in FIG. 3 in that the storage capacitor wiring Csn also serves as the two wirings (Vsm wiring and Vrwn wiring). This circuit configuration makes it unnecessary to additionally provide the two wirings (Vsm wiring and Vrwn wiring). This leads to increase in the aperture ratio.

Further, reduction in the number of wirings from three to one makes it unnecessary to provide ICs for driving the reduced two wirings. This also makes it unnecessary to provide drawing wirings for the ICs which drawing wirings surround the display section, and regions where the ICs are provided. It is therefore possible to narrow a frame part of the optical sensor TP system.

Figure 9:
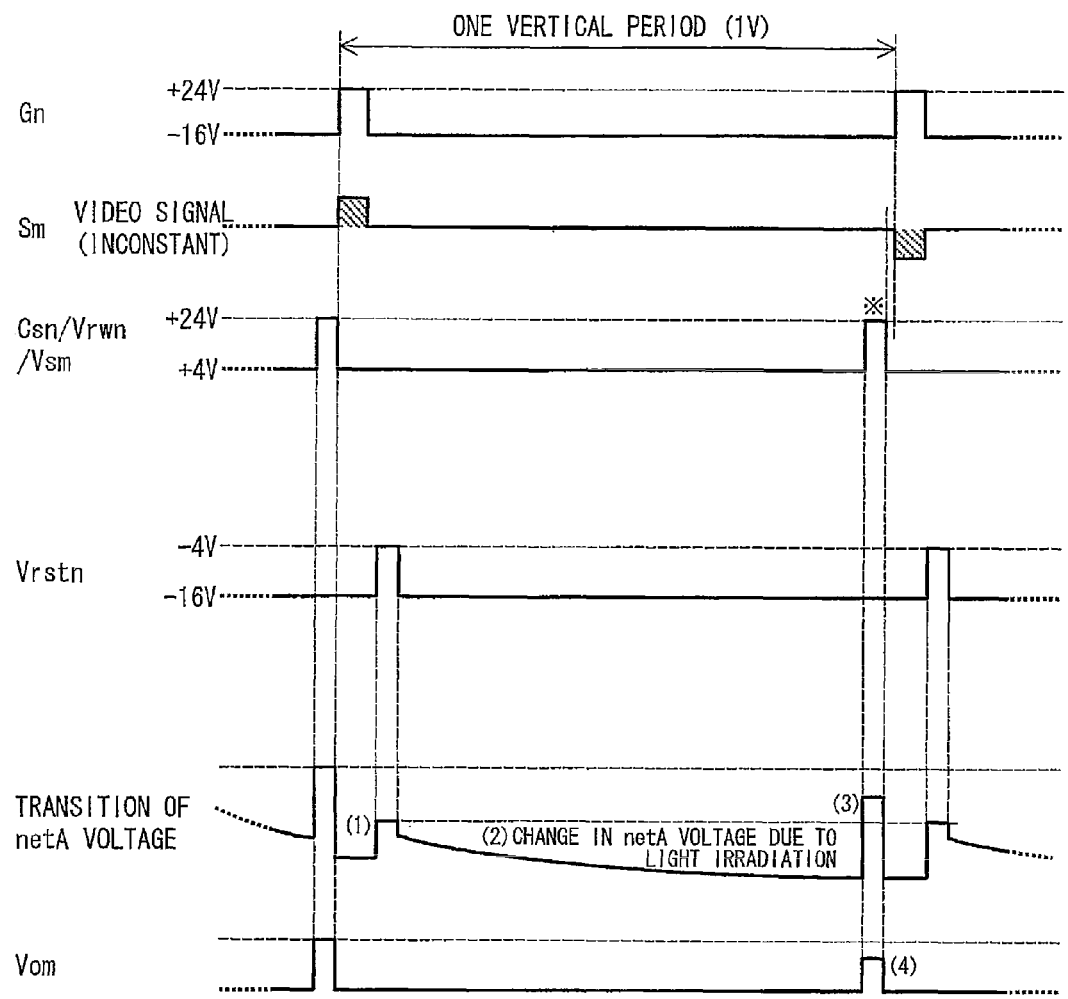
FIG. 9 is a timing chart of the equivalent circuit shown in FIG. 8.
Figure 10:
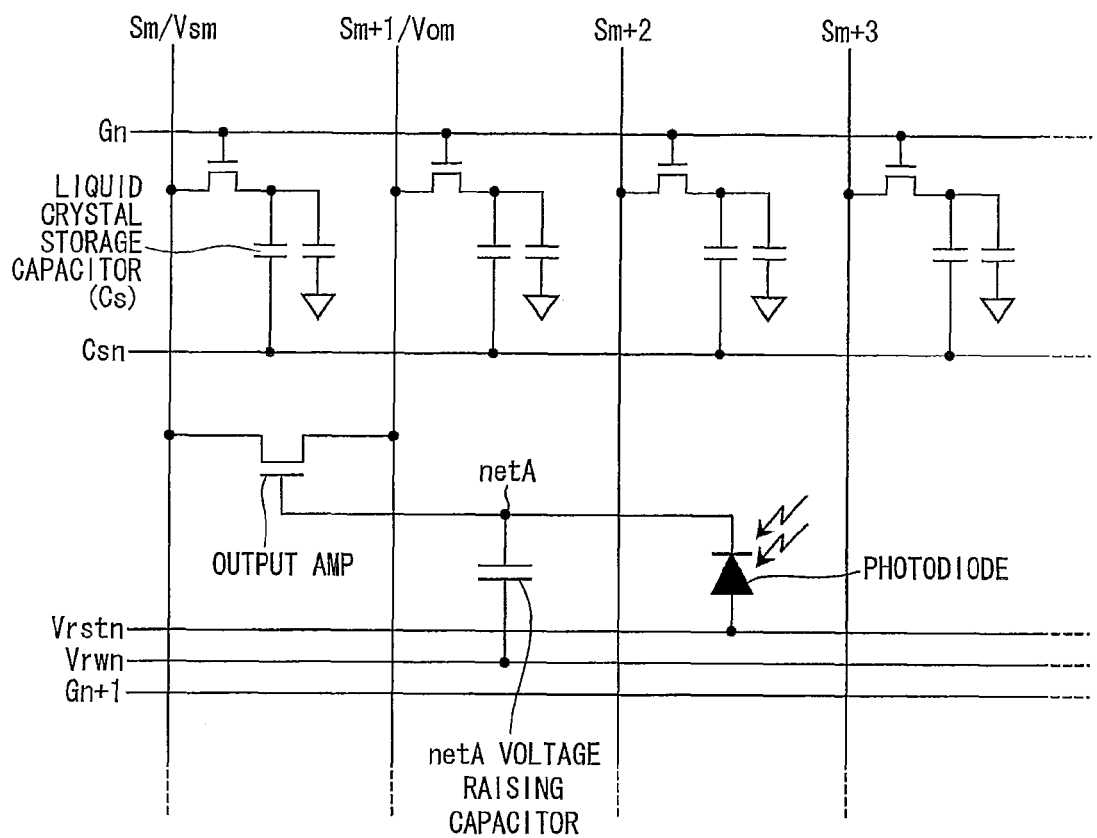
FIG. 10 is an equivalent circuit diagram of a conventional two-dimensional sensor array.
Figure 11:
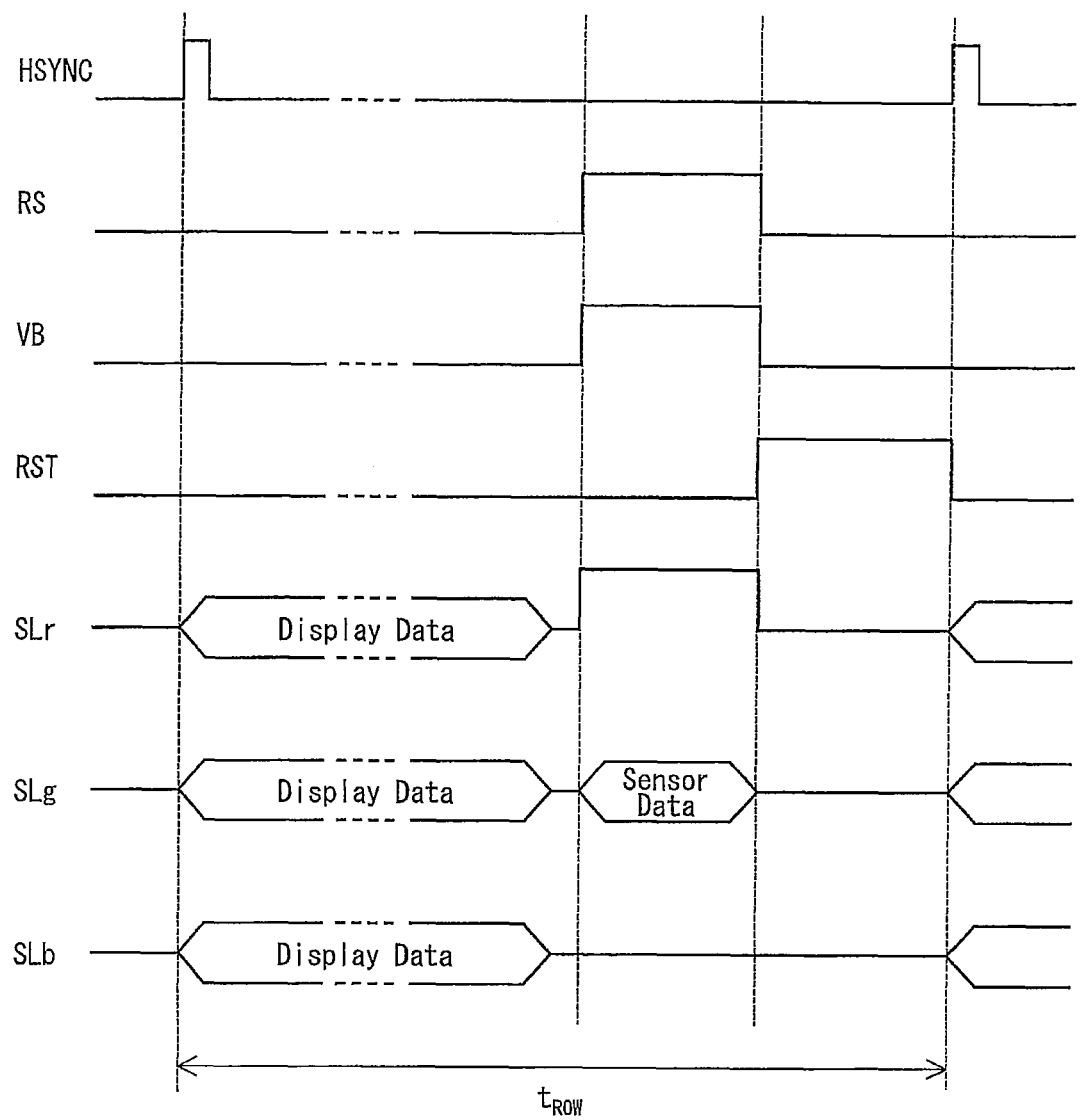
FIG. 11 is a timing chart of the two-dimensional sensor array shown in FIG. 10.
Figure 12:
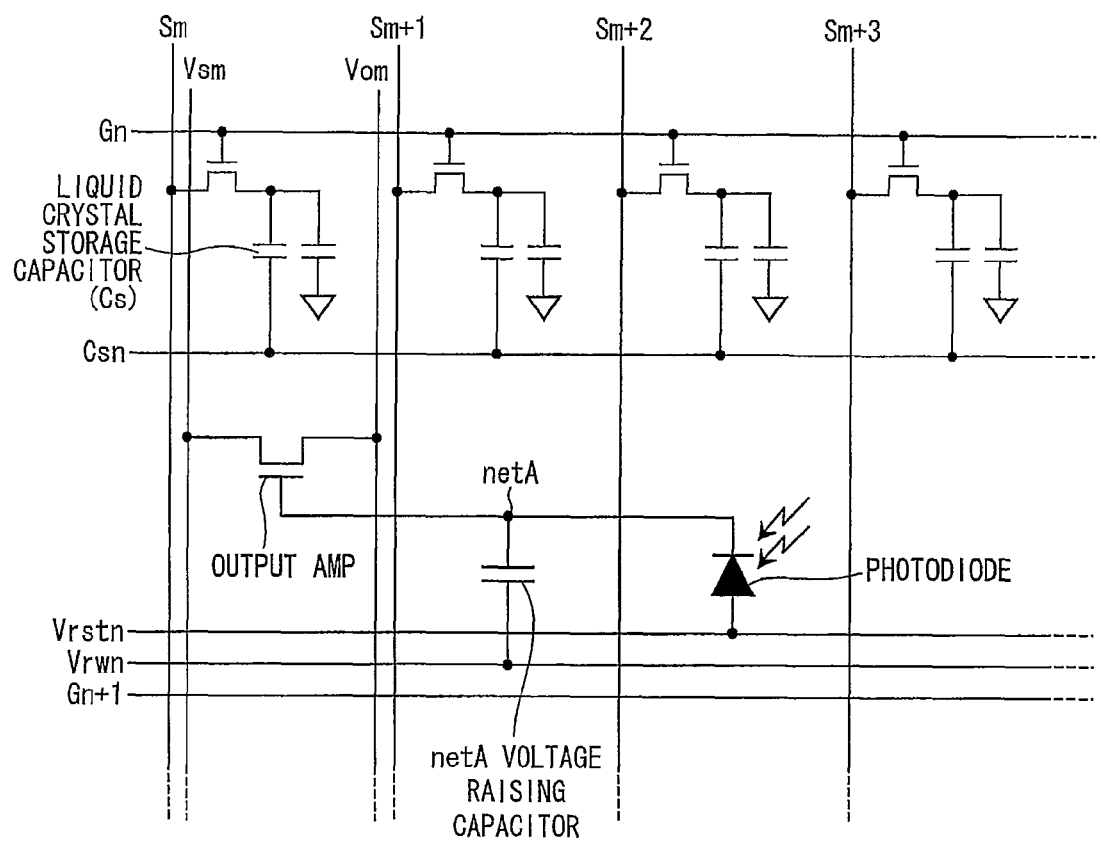
FIG. 12 is an equivalent circuit diagram of another conventional two-dimensional sensor array.

The circuit shown in FIG. 8 is configured with elements in such a manner that the circuit of First Embodiment is configured. Further, the circuit shown in FIG. 8 is driven under a drive condition identical to the drive condition under which the circuit of First Embodiment is driven. FIG. 9 shows a timing chart in a case where the circuit shown in FIG. 8 is driven under the above drive. (1) to (4) shown in FIG. 9 correspond to the following (1) to (4), respectively.

(1) A voltage of a NetA is reset to a voltage closer to a reset voltage high-level by raising the voltage applied to the Vrstn wiring (applying forward bias to the photodiode 17).

(2) The voltage of the NetA changes (deteriorates) in accordance with quantity of light that the photodiode 17 receives.

(3) In a case a voltage applied to a power supply line (corresponding to the Vsn wiring included in the circuit of the comparative example shown in FIG. 3) for supplying a voltage to the AMP, and the voltage applied to the Csn wiring connected to the NetA voltage raising capacitor wiring (corresponding to the Vrwn wiring included in the circuit of the comparative example shown in FIG. 3) are raised, a voltage equivalent to the raised voltage is accordingly outputted. The outputted voltage (sensor output Vout) is different depending on difference between the voltages of the NetA described in (2), in other words, how much the gate of the output AMP opens.

(4) The difference between the outputted voltages (sensor output Vout) described in (3) is detected outside a panel. In this manner, white/black state is detected.

What is important here is, in the circuit configuration shown in FIG. 8, to raise the voltage applied to the Csn wiring immediately before the picture element is charged, and to read the sensor output Vout prior to starting to charge the picture element (to terminate sensing operation).

That is, in the circuit configuration shown in FIG. 8 in which the Csn wiring also serves as the Vrwn, raising the voltage applied to the Csn wiring causes increase in the picture element potential. Increasing the voltage applied to the Csn wiring immediately before the picture element is charged makes it possible to obscure the shift of the picture element potential.

According to the circuit configuration of the comparative example shown in FIG. 3, the voltage applied to the Csn wiring is fixed to the DC level (+4V in FIG. 5), and therefore the picture element potential is not shifted. Further, as described in First and Second Embodiments, the Vrwn wiring is provided in addition to the Csn wiring. Therefore, the timing for sensing operation is not particularly limited at any time, provided that the timing should be within the period in which the picture element is charged (period in which the voltage applied to the Gn wiring is raised).

As described above, the optical sensor TP system of the present invention is arranged such that the storage capacitor wiring (Csn) for supplying an external voltage to a liquid crystal storage capacitor (Cs) provided in each pixel also serves as at least one of a drive wiring (Vrwn) for supplying a drive signal to a charge-storage element (NetA voltage raising capacitor) that constitutes an optical sensor circuit, and a voltage supply wiring (Vsm) for supplying a voltage to a thin film transistor element (output AMP) that constitutes the optical sensor circuit. This arrangement provides the pixel with a greater aperture ratio by reducing the number of wirings by causing the storage capacitor wiring (Csn) to also serve as the at least one of the drive wiring (Vrwn) and the voltage supply wiring (Vsm).

This arrangement also makes it unnecessary to provide not only an IC for driving the wiring but also a drawing wiring for the IC which drawing wiring surrounds the display section, and a region where the IC is provided. It is therefore possible to narrow a frame part of the optical sensor TP system of the present invention.

Further, the present embodiment describes a case where the circuit shown in FIG. 8 is configured such that the storage capacitor wiring Csn also serves as the two wirings (Vsm wiring and Vrwn wiring). Meanwhile, any one of the three wirings may also serve as remaining two wirings of the three wirings. For example, the Vsm wiring may also serve as the two wirings (storage capacitor wiring Csn and Vrwn wiring). Alternatively, the Vrwn wiring may also serve as the two wirings (storage capacitor wiring Csn and Vsm wiring).

Further, examples of an electronics device to which the liquid crystal display device of the present invention is applied encompass a personal digital assistant (PDA), a mobile phone and a personal computer display.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is suitably applicable to an electronics device in which a touch panel is incorporated.

REFERENCE SIGNS LIST

1: display panel
2: display scanning signal line drive circuit
3: display video signal line drive circuit
4: sensor scanning signal line drive circuit
5: sensor read circuit
6: power supply circuit
17: photodiode
20: display drive TFT element

The invention claimed is:

1. A liquid crystal display device, comprising:
an active matrix substrate in which at least a scanning signal line, a video signal line, a thin film transistor element for driving a pixel, a pixel electrode and a storage capacitor wiring for retaining an electric potential of the pixel electrode are provided;
a counter substrate facing the active matrix substrate;
a liquid crystal layer sandwiched between the active matrix substrate and the counter substrate; and
a two-dimensional sensor array in which optical sensor circuits are two-dimensionally positioned,
the optical sensor circuits each including at least a photodiode that outputs a signal corresponding to quantity of light that the photodiode receives, a thin film transistor element and a charge-storage element,
the thin film transistor having a gate electrode, a source electrode and a drain electrode, the gate electrode, the source electrode and the drain electrode being connected to a cathode electrode of the photodiode, a voltage supply wiring and an optical sensor output wiring, respectively,
the charge-storage element having two electrodes, one of the two electrodes being electrically connected to the cathode electrode of the photodiode, and the other of the two electrodes being electrically connected to a drive wiring for supplying a drive signal to the charge-storage element, and
the storage capacitor wiring also serving as at least one of the drive wiring for driving the charge-storage element and the voltage supply wiring for supplying a voltage to the thin film transistor element.

2. The liquid crystal display device as set forth in claim 1, wherein:
a voltage applied to the storage capacitor wiring is changed to a predetermined electric potential immediately before a voltage of the pixel electrode of the liquid crystal display device is rewritten.

3. The liquid crystal display device as set forth in claim 1, wherein:
a single wiring serves as the storage capacitor wiring, the drive wiring and the voltage supply wiring.

4. The liquid crystal display device as set forth in claim 1, wherein:
in a case where the storage capacitor wiring also serves as the voltage supply wiring, the storage capacitor wiring is DC-driven.

5. An electronics device, comprising:
a liquid crystal display device including an active matrix substrate in which at least a scanning signal line, a video signal line, a thin film transistor element for driving a pixel, a pixel electrode and a storage capacitor wiring for retaining an electric potential of the pixel electrode are provided;
a counter substrate facing the active matrix substrate;
a liquid crystal layer sandwiched between the active matrix substrate and the counter substrate; and
a two-dimensional sensor array in which optical sensor circuits are two-dimensionally positioned,
the optical sensor circuits each including at least a photodiode that outputs a signal corresponding to quantity of light that the photodiode receives, a thin film transistor element and a charge-storage element,
the thin film transistor having a gate electrode, a source electrode and a drain electrode, the gate electrode, the source electrode and the drain electrode being connected to a cathode electrode of the photodiode, a voltage supply wiring and an optical sensor output wiring, respectively,
the charge-storage element having two electrodes, one of the two electrodes being electrically connected to the cathode electrode of the photodiode, and the other of the two electrodes being electrically connected to a drive wiring for supplying a drive signal to the charge-storage element, and
the storage capacitor wiring also serving as at least one of the drive wiring for driving the charge-storage element and the voltage supply wiring for supplying a voltage to the thin film transistor element.

* * * * *